United States Patent
Clark et al.

(10) Patent No.: US 8,122,782 B2
(45) Date of Patent: Feb. 28, 2012

(54) PINION SHAFT AND BEARING ASSEMBLY

(75) Inventors: Steven L. Clark, Canton, MI (US);
Jeffrey R. Lee, Tipton, MI (US);
Christopher Scagnetti, Canton, MI (US); Chris F Stinehour, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 558 days.

(21) Appl. No.: 12/203,453

(22) Filed: Sep. 3, 2008

(65) Prior Publication Data

US 2010/0050798 A1 Mar. 4, 2010

(51) Int. Cl.
*F16H 55/00* (2006.01)
(52) U.S. Cl. .......................................................... 74/431
(58) Field of Classification Search .................... 74/391, 74/431; 29/889.07; 384/49, 625
See application file for complete search history.

(56) References Cited

U.S. PATENT DOCUMENTS

| 2,197,883 | A | * | 4/1940 | Sinclair ........................ 29/898.07 |
| 3,141,233 | A | * | 7/1964 | Schneider ........................... 29/598 |
| 4,204,594 | A | * | 5/1980 | Banno ............................. 198/827 |
| 4,401,349 | A | * | 8/1983 | Campbell ......................... 384/520 |
| 5,482,381 | A | * | 1/1996 | Krum et al. ...................... 384/480 |
| 6,045,200 | A | * | 4/2000 | Anderton et al. ................ 305/104 |
| 6,513,984 | B1 | * | 2/2003 | Hobaugh, II ..................... 384/537 |
| 6,645,415 | B2 | * | 11/2003 | Takatsu ............................ 264/262 |
| 6,709,162 | B2 | * | 3/2004 | Muraki et al. ................... 384/504 |
| 7,341,138 | B1 | * | 3/2008 | Wendt et al. .................... 193/35 R |
| 7,744,284 | B2 | * | 6/2010 | Tada et al. ........................ 384/537 |
| 2003/0059143 | A1 | * | 3/2003 | Pairone et al. ................... 384/537 |

* cited by examiner

*Primary Examiner* — Vicky Johnson

(57) ABSTRACT

A pinion shaft and bearing assembly is provided having two different surface finish interfaces. A first surface finish functions to locate the bearing to the pinion. A second surface finish functions to improve the cure time of an adhesive used to retain the bearing to the pinion.

24 Claims, 3 Drawing Sheets

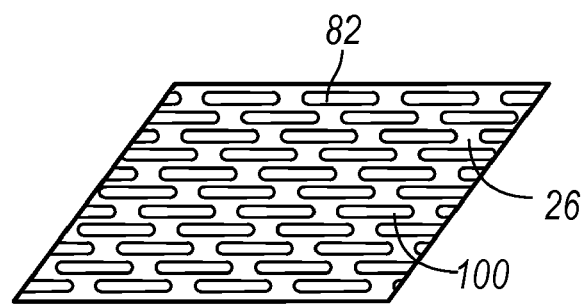
FIG. 6
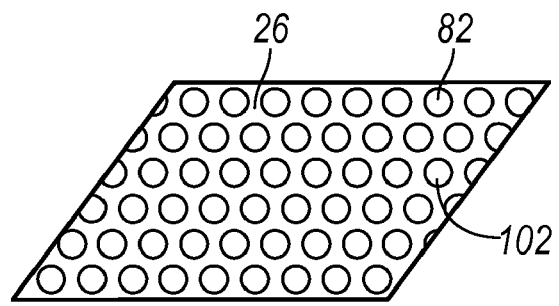 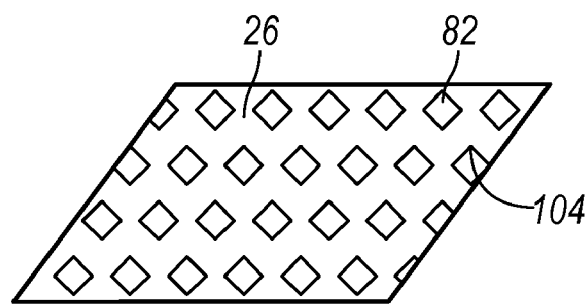
FIG. 7  FIG. 8

PINION SHAFT AND BEARING ASSEMBLY

FIELD

The present invention relates generally to a pinion shaft and bearing assembly, and more particularly to a pinion shaft and bearing assembly using an adhesive for improved bearing location and retention of an inner race of a rolling element bearing.

BACKGROUND

The statements in this section merely provide background information related to the present disclosure and may or may not constitute prior art.

A typical pinion shaft and bearing assembly uses various mechanisms to maintain sufficient friction between the pinion shaft and the bearing to prevent the bearing from spinning free from or walking off the pinion shaft. These mechanisms include various mechanical methods of coupling the bearing to the pinion shaft such as, for example, press-fitting the bearing to the pinion shaft. The effectiveness of these mechanisms may be enhanced by the addition of an anaerobic adhesive between the pinion shaft and the bearing.

Typically, the anaerobic adhesive is applied to the pinion shaft or bearing prior to assembly and is cured in situ. The adhesive fits within gaps formed on the surfaces due to surface roughness. In general applications the cure time for the anaerobic adhesive is a function of the gap between the pinion shaft and the bearing. The cure times are shorter when the anaerobic adhesive is applied to a smaller gap. Also, the relationship between retention strength of the adhesive and surface roughness is integral in the robustness of the assembly where the rougher the surface finish the higher the retention strength achieved.

However, the location accuracy (i.e., the radial and axial position) of the bearing on the pinion shaft improves when tight dimensional controls are employed. One result of tight dimensional controls is smooth surface finish. In balancing the needs for tight location accuracy and high bearing retention strength, location accuracy is typically favored. Alternative solutions for preventing bearing spin or walk while maintaining location accuracy include integrated bearing sleeves or mechanical retention of the bearing. However, these alternative solutions may increase cost and may not be practical due to packaging restraints. Accordingly, there is a need in the art for a pinion shaft and bearing assembly that increases the effectiveness of anaerobic adhesives without increasing cure time and without decreasing locational accuracy.

SUMMARY

A pinion shaft and bearing combination is provided including a pinion shaft with at least two outer regions each having a different surface finish and a pinion bearing with at least two inner regions each having a different surface finish.

An embodiment of a pinion shaft and bearing combination is provided having a pinion shaft having a first outer region with a first surface treatment and a second outer region with a second surface treatment. A pinion bearing is disposed on the pinion shaft with the pinion bearing having a first inner region with a third surface treatment and a second inner region with a fourth surface treatment. An adhesive is applied to one or both of the second outer region and the second inner region. The first surface treatment and the third surface treatment cooperate to locate the pinion bearing on the pinion shaft and the second surface treatment and the fourth surface treatment cooperate to improve a performance of the adhesive.

In another embodiment of the present invention, the pinion shaft defines a longitudinal axis and includes a first pinion end and a second pinion end disposed opposite the first pinion end along the longitudinal axis.

In yet another embodiment of the present invention, the first outer region is located on an outer surface of the pinion shaft and extends from the first pinion end a first distance along the longitudinal axis.

In yet another embodiment of the present invention, the second outer region is located on the outer surface of the pinion shaft and extends from the first outer region a second distance along the longitudinal axis.

In yet another embodiment of the present invention, the pinion shaft includes a third outer region on the outer surface of the pinion shaft, the third outer region having the first surface treatment and extending from the second outer region a third distance along the longitudinal axis to the second pinion end.

In yet another embodiment of the present invention, the first distance is approximately equal to the third distance, and the second distance is greater than the first and third distances.

In yet another embodiment of the present invention, the pinion bearing is concentric with the pinion shaft and includes a first bearing end and a second bearing end disposed opposite the first bearing end along the longitudinal axis.

In yet another embodiment of the present invention, the first inner region is located on an inner surface of the pinion bearing and extends from the first bearing end a fourth distance along the longitudinal axis.

In yet another embodiment of the present invention, the second inner region is located on the inner surface of the pinion bearing and extends from the first inner region a fifth distance along the longitudinal axis.

In yet another embodiment of the present invention, the pinion bearing includes a third inner region on the inner surface of the pinion bearing, the third inner region having the third surface treatment and extending from the second inner region a sixth distance along the longitudinal axis to the second bearing end.

In yet another embodiment of the present invention, the fourth distance is approximately equal to the sixth distance, and the fifth distance is greater than the fourth and sixth distances.

In yet another embodiment of the present invention, the first and third surface treatments result in a surface finish from about 0.10 to about 0.35 μm Ra.

In yet another embodiment of the present invention, the second and fourth surface treatments result in a surface having a plurality of indentations about 0.025 mm deep and have a surface finish of about 1.0 to about 3.2 μm Ra.

In yet another embodiment of the present invention, the first inner region of the pinion bearing is disposed opposing the first outer region of the pinion shaft and the second inner region of the pinion bearing is disposed opposing the second outer region of the pinion shaft.

In yet another embodiment of the present invention, the first inner region is press fit to the first outer region.

In yet another embodiment of the present invention, the second surface treatment of the second outer region and the second surface treatment of the second inner region cooperate to define a plurality of gaps between the pinion bearing and the pinion shaft.

In yet another embodiment of the present invention, the adhesive is disposed within the gaps.

In yet another embodiment of the present invention, the gaps are comprised of at least one of continuous elongated divots, round pockets, diamond pockets, and square pockets.

In yet another embodiment of the present invention, the gaps are continuous channels.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 6 is a magnified view of an exemplary surface structure showing a continuous feature;

FIG. 7 is a magnified view of an exemplary surface structure showing a pocket surface structure; and FIG. 8 is a further magnified view of an exemplary surface structure showing another pocket surface structure.

DETAILED DESCRIPTION

The following description is merely exemplary in nature and is not intended to limit the present disclosure, application, or uses.

Figure 1:
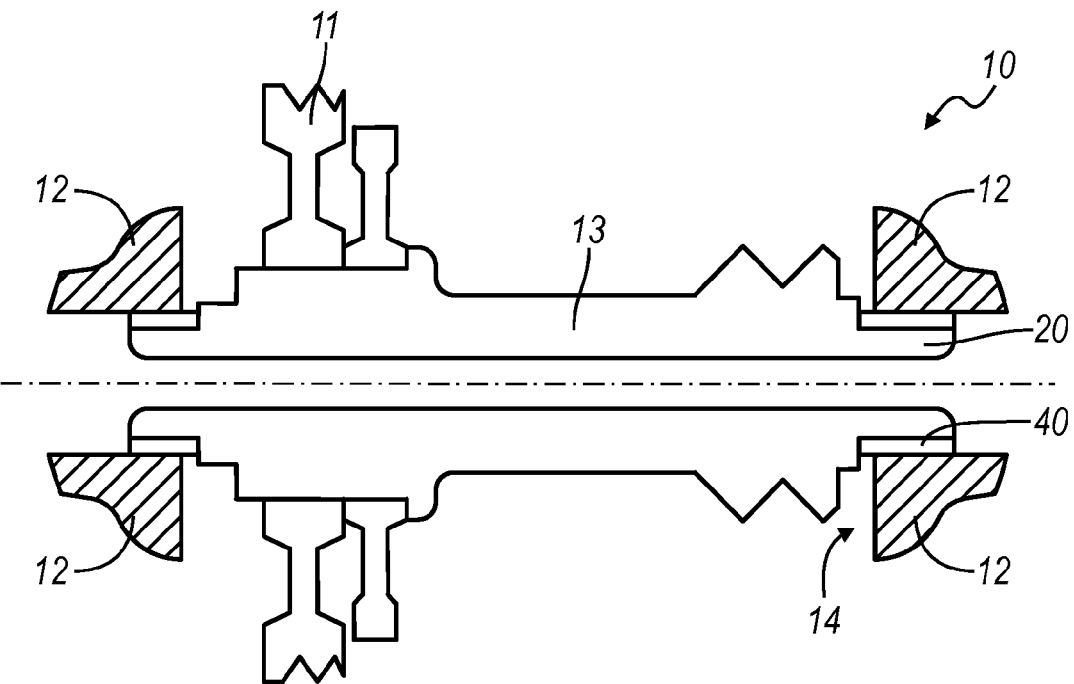
FIG. 1 is a side view of a gear and shaft assembly including an embodiment of a pinion shaft and bearing assembly according to the principles of the present invention.

Referring to FIG. 1, a side view of an exemplary gear and shaft assembly is generally indicated by reference number 10. The gear and shaft assembly 10 is preferably located in a transmission (not shown) and is supported by at least one member 12. The member 12 may take various forms, such as a non-rotational housing member, a radial rolling element bearing, or a rotating sleeve shaft without departing from the scope of the present invention. The gear and shaft assembly 10 includes a gear 11, a shaft 13, and at least one pinion shaft and bearing assembly 14 according to the principles of the present invention. The gear 11 intermeshes with a second gear (not shown) providing torque and rotation to the gear and shaft assembly 10. The gear 11 is drivingly mounted to the shaft 13 which integrates the pinion shaft and bearing assembly 14. The pinion shaft and bearing assembly 14 generally includes a pinion shaft 20 integrated with the shaft 13 and a bearing 40 coupled to the pinion shaft 20, as will be described in greater detail below. The bearing 40 provides a material more suitable for improving the durability and performance of the pinion shaft 20 than the shaft 13 material alone.

Figure 2:
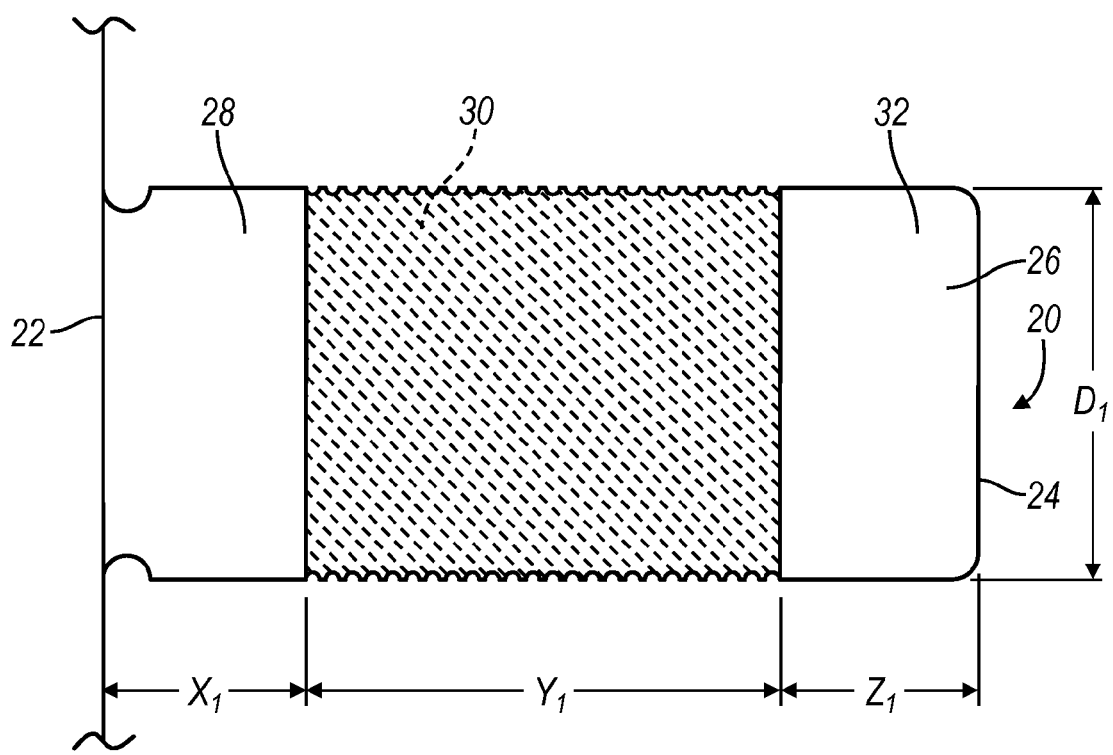
FIG. 2 is a side view of an embodiment of a pinion according to the principles of the present invention.

Referring to FIG. 2, a side view of the pinion shaft 20 proximate to the bearing 40 is illustrated and will now be described in detail. The pinion shaft 20 is generally cylindrical with an approximately circular cross-section, although other cross-sectional shapes may be employed without departing from the scope of the present invention. The pinion shaft 20 has a diameter $D_1$ and includes a base end 22 and a distal end 24 located opposite the base end 22. The pinion shaft 20 further includes an outer surface 26 that has a first outer region 28, a second outer region 30, and a third outer region 32. Each of the outer regions 28, 30, 32 are circumferentially continuous on the pinion shaft 20. The first outer region 28 extends axially from the base end 22 of the pinion shaft 20 a distance of $X_1$. The second outer region 30 extends axially from the first outer region 28 a distance of $Y_1$. The third outer region 32 extends axially from the second outer region 24 a distance of $Z_1$ to the distal end 24 of the pinion shaft 20. In the example provided, the first and third outer regions 28, 32 have a surface with a microfinish below about 0.25 μm Ra. The second outer region 30 has a surface that is treated to create a plurality of features or indentations 31 reaching about 0.025 mm in depth where the surface of the indentations 31 have a microfinish of about 1.0 μm to 3.2 μm Ra. However, it should be appreciated that other microfinishes may be used without departing from the scope of the present invention. The surface finish of the second outer region 30 is greater than or equal to the surface finish of the first outer region 28 and less than the surface finish of the indentations 31. Additionally, the distances $X_1, Y_1, Z_1$ may be adjusted depending upon the application. In the embodiment provided, distances $X_1$ and $Z_1$ are approximately equal and the distance $Y_1$ is greater than the distances $X_1$ and $Z_1$. However, the distance $Y_1$ is directly related to a retention force of the bearing 40 on the pinion shaft 20 required for a particular application.

Figure 3:
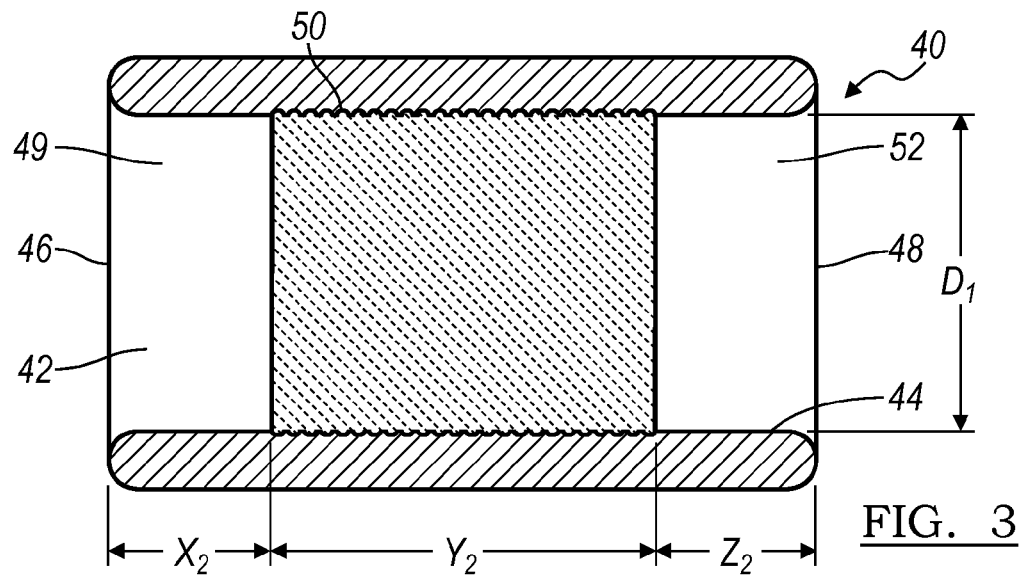
FIG. 3 is a cross-sectional view of an embodiment of a bearing according to the principles of the present invention.

Turning now to FIG. 3, a cross-sectional view of the bearing 40 is illustrated and will now be described. The bearing 40 is generally cylindrical and includes an inner race or surface 42 that defines a central bore 44. The central bore 44 has a diameter $D_2$. The bearing 40 further includes a first end 46 and a second end 48 opposite the first end 46. The inner surface 42 includes a first inner region 49, a second inner region 50, and a third inner region 52. The first inner region 49 extends axially from the first end 46 of the bearing 40 a distance of $X_2$. The second inner region 50 extends axially from the first inner region 49 a distance of $Y_2$. The third inner region 52 extends axially from the second inner region 50 a distance of $Z_2$ to the second end 48 of the bearing 40. In the example provided, the first and third inner regions 49, 52 have a microfinish below about 0.25 μm Ra. The second inner region 50 has a surface that is treated to create a plurality of features or indentations 51 reaching about 0.025 mm in depth where the surface of the indentations 51 have a microfinish of about 1.0 μm to 3.2 μm Ra. However, it should be appreciated that other microfinishes may be used without departing from the scope of the present invention. The surface finish of the second inner region 50 is greater than or equal to the surface finish of the first inner region 49 and less than the surface finish of the indentations 51. Additionally, the distances $X_2, Y_2, Z_2$ may be adjusted depending upon the application. In the embodiment provided, distances $X_2$ and $Z_2$ are approximately equal and the distance $Y_2$ is greater than the distances $X_2$ and $Z_2$. However, the distance $Y_2$ is directly related to a retention force of the bearing 40 on the pinion shaft 20 required for a particular application. Furthermore, the distances $X_2, Y_2, Z_2$ are approximately equal to the distances $X_1, Y_1, Z_1$ respectively.

Figure 4:
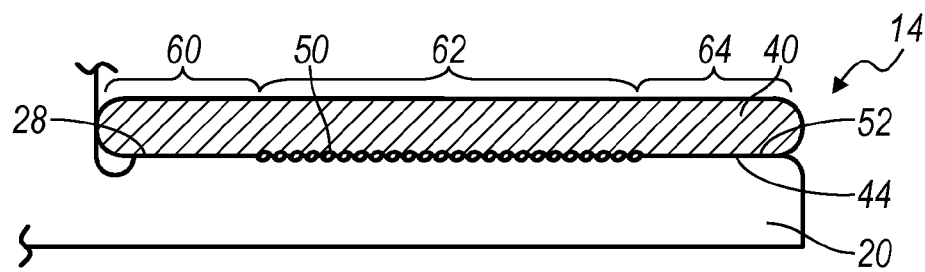
FIG. 4 is a cross-sectional view of an embodiment of a bearing installed on a pinion according to the principles of the present invention.
Figure 4:
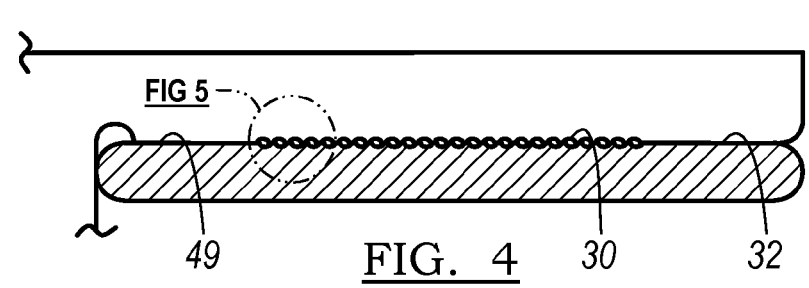

Referring now to FIG. 4, a cross-sectional view of the pinion and bearing assembly 14 with the bearing 40 installed on the pinion shaft 20 is illustrated and will now be described. The pinion bearing 40 is installed onto the pinion shaft 20 such that the pinion shaft 20 is located within the central bore 44. As installed, the first inner region 49 opposes the first outer region 28, the second inner region 50 opposes the second outer region 30, and the third inner region 52 opposes the third outer region 32. Where the first inner region 49 and first outer region 28 contact, the diameters D1 and D2 create a first press fit region 60. The contact between the third inner region 52 and third outer region 32 creates a second press fit region 64. The press fit is accomplished by providing that diameter D2 is smaller or equal to the diameter D1. The overlap in diameters D1 and D2 ensures that there is no space between the pinion bearing 40 and the pinion shaft 20 for the pinion bearing 40 to move once installed on the pinion shaft 20. Thus the press fit regions 60, 64 allow the pinion bearing 40 to be accurately located on the pinion shaft 20 by minimizing relative movement between the parts.

Figure 5:
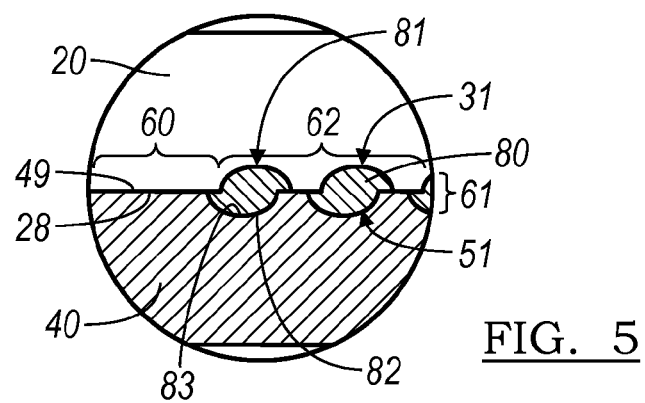
FIG. 5 is an enlarged cross-sectional view of an embodiment of a bearing installed on a pinion detailing the surface finishes.

As the pinion bearing 40 is installed on the pinion shaft 20, the second inner region 50 opposes second outer region 30 each having a surface pattern of features or indentations 31, 51. The depth of the indentations 82 is around 0.025 mm thus providing a gap 61, as shown in FIG. 5, of at most around 0.05 mm when two indentations 31, 51 are stacked on top of one another. The gap 61 provides a volume 81 for depositing an anaerobic adhesive 80 into the adhesive region 62 by applying it to one of or both of the outer surface 26 of the pinion shaft 20 and the inner surface 42 of the bearing 40 prior to installation. A preferred anaerobic adhesive 80, for example, Loctite® 609 or 680 Retaining Compound or Loctite® Sleeve Retainer 640 manufactured by Henkel Corporation of Warren, Mich., although various other adhesives may be employed without departing from the scope of the present invention. One result of the surface treatment is that the inner surface 83 of the indentations 82 has a surface roughness of about 1.0 µm to about 3.2 µm Ra. As noted above, the press fit region 60 is accomplished by providing that diameter D2 is smaller or equal to the diameter D1 and is used to precisely locate the bearing 40 on the pinion shaft 20. The press fit also provides an initial retention force resulting from stretching the pinion bearing 40 material and compressing the pinion shaft 20 material.

Referring now to FIGS. 6-8, magnified views of various embodiments of the indentations 82 in the second outer region 30 of the outer surface 26 of the pinion shaft 20 resulting from various stages of processing are shown and will now be described. Initially the outer surface 26 is honed or ground to slightly larger finished size. Next, laser processing creates the indentations 82, for example, as continuous elongated channels 82, shown in FIG. 6. When the material is removed from the outer surface 26, displaced material (not shown) is formed near the indentations 82. Finally, the outer surface is finished honed producing the surface finish. Any displaced material remaining on the outer surface 26 but outside of the specified diameter is removed. The indentations 82 may also have shapes other than a continuous channel without departing from the scope of the present invention. For example, FIG. 6 shows the embodiment wherein the indentations 82 take the form of a pattern of continuous, elongated pockets 100. FIG. 7 shows another embodiment of the finished surface wherein the indentations 82 form a pattern of round pockets 102. FIG. 8 shows still another embodiment of the finished surface wherein the indentations 82 form a pattern of pattern of diamond or square pockets 104. These surface features described in FIGS. 6-8 cooperate to form the pockets 82, as described above. It should be appreciated that other surface features may be employed without departing from the scope of the present invention. FIGS. 6-8 may also represent the second inner surface 50 of the inner surface 42 of the bearing 40 without departing from the scope of this invention.

The description of the invention is merely exemplary in nature and variations that do not depart from the gist of the invention are intended to be within the scope of the invention. Such variations are not to be regarded as a departure from the spirit and scope of the invention.

What is claimed is:

1. A pinion shaft and bearing assembly comprising:
   a pinion shaft having a first outer region having a first surface treatment and a second outer region having a second surface treatment;
   a pinion bearing disposed on the pinion shaft, the pinion bearing having a first inner region having a third surface treatment and a second inner region having a fourth surface treatment; and
   an adhesive disposed on at least one of the second outer region and the second inner region, and
   wherein the first surface treatment and the third surface treatment cooperate to locate the pinion bearing on the pinion shaft and the second surface treatment and the fourth surface treatment cooperate to increase a strength of a bond of the adhesive.

2. The pinion shaft and bearing assembly of claim 1 wherein the pinion shaft defines a longitudinal axis and includes a first pinion end and a second pinion end disposed opposite the first pinion end along the longitudinal axis.

3. The pinion shaft and bearing assembly of claim 2 wherein the first outer region is located on an outer surface of the pinion shaft and extends from the first pinion end a first distance along the longitudinal axis.

4. The pinion shaft and bearing assembly of claim 3 wherein the second outer region is located on the outer surface of the pinion shaft and extends from the first outer region a second distance along the longitudinal axis.

5. The pinion shaft and bearing assembly of claim 4 wherein the pinion shaft includes a third outer region on the outer surface of the pinion shaft, the third outer region having the first surface treatment and extending from the second outer region a third distance along the longitudinal axis to the second pinion end.

6. The pinion shaft and bearing assembly of claim 5 wherein the first distance is approximately equal to the third distance, and the second distance is greater than the first and third distances.

7. The pinion shaft and bearing assembly of claim 2 wherein the pinion bearing is concentric with the pinion shaft and includes a first bearing end and a second bearing end disposed opposite the first bearing end along the longitudinal axis.

8. The pinion shaft and bearing assembly of claim 7 wherein the first inner region is located on an inner surface of the pinion bearing and extends from the first bearing end a fourth distance along the longitudinal axis.

9. The pinion shaft and bearing assembly of claim 8 wherein the second inner region is located on the inner surface of the pinion bearing and extends from the first inner region a fifth distance along the longitudinal axis.

10. The pinion shaft and bearing assembly of claim 9 wherein the pinion bearing includes a third inner region on the inner surface of the pinion bearing, the third inner region having the third surface treatment and extending from the second inner region a sixth distance along the longitudinal axis to the second bearing end.

11. The pinion shaft and bearing assembly of claim 10 wherein the fourth distance is approximately equal to the sixth distance, and the fifth distance is greater than the fourth and sixth distances.

12. The pinion shaft and bearing assembly of claim 1 wherein the first and third surface treatments result in a surface finish from about 0.10 to about 0.35 µm Ra.

13. The pinion shaft and bearing assembly of claim 1 wherein the second and fourth surface treatments result in a surface having a plurality of indentations about 0.025 mm deep wherein the indentations have a surface finish of about 1.0 to about 3.2 μm Ra.

14. The pinion shaft and bearing assembly of claim 1 wherein the first inner region of the pinion bearing is disposed opposing the first outer region of the pinion shaft and the second inner region of the pinion bearing is disposed opposing the second outer region of the pinion shaft.

15. The pinion shaft and bearing assembly of claim 14 wherein the first inner region is press fit to the first outer region.

16. The pinion shaft and bearing assembly of claim 14 wherein the second surface treatment of the second outer region and the second surface treatment of the second inner region cooperate to define a plurality of gaps between the pinion bearing and the pinion shaft.

17. The pinion shaft and bearing assembly of claim 16 wherein the adhesive is disposed within the gaps.

18. The pinion shaft and bearing assembly of claim 17 wherein the indentations are comprised of at least one of continuous elongated divots, round pockets, diamond pockets, and square pockets.

19. The pinion shaft and bearing assembly of claim 17 wherein the indentations are continuous channels.

20. An assembly comprising:
 a pinion shaft having a first outer region and a second outer region;
 a pinion bearing disposed on the pinion shaft, the pinion bearing having a first inner region and a second inner region; and
 an adhesive disposed between the second outer region and the second inner region, and
 wherein each of the second outer region and the second inner region include a surface having a plurality of features disposed therein, the plurality of features having a surface finish rougher than a surface finish of at least one of the surface of the second outer region and second inner region and wherein the first inner region and the first outer region each have a surface finish smoother than the surface finish of at least one of the surface of the second outer region and the second inner region.

21. The assembly of claim 20 wherein the features are indentations in the surface of at least one of the second outer region and the second inner region.

22. The assembly of claim 21 wherein the indentations have a surface having a surface finish that is rougher than a surface finish of the surface of at least one of the second inner region and the second outer region.

23. The assembly of claim 21 wherein the indentations have a surface having a surface finish that is rougher than a surface finish of the first inner region and the first outer region.

24. The assembly of claim 21 wherein the indentations are created by laser etching at least the surface of at least one of the second inner region and the second outer region.

* * * * *